United States Patent
Takeda et al.

(10) Patent No.: US 6,370,111 B1
(45) Date of Patent: Apr. 9, 2002

(54) METHOD FOR CONTROLLING COMMUNICATION OF MOBILE EQUIPMENT AND MOBILE EQUIPMENT

(75) Inventors: Yasuhide Takeda, Hino; Naohide Kushige, Machida, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/202,449

(22) PCT Filed: Apr. 13, 1998

(86) PCT No.: PCT/JP98/01682

§ 371 Date: Dec. 15, 1998

§ 102(e) Date: Dec. 15, 1998

(87) PCT Pub. No.: WO98/47245

PCT Pub. Date: Oct. 22, 1998

(30) Foreign Application Priority Data

Apr. 15, 1997 (JP) .............................................. 9-097429

(51) Int. Cl.$^7$ ................................................. H04B 1/16
(52) U.S. Cl. ...................... 370/216; 370/331; 370/468; 455/343; 455/574; 375/295
(58) Field of Search ................................ 370/216, 468, 370/350, 445, 280, 334, 345, 341, 314, 335, 471, 312, 281, 509, 331; 455/343, 442, 39, 574; 375/133, 211, 222, 267, 136, 134, 308, 356, 283, 260, 295, 247, 346; 359/172; 340/825.08; 709/228

(56) References Cited

U.S. PATENT DOCUMENTS 5,068,916 A * 11/1991 Harrison et al. ............... 455/39
5,507,039 A * 4/1996 Honma ......................... 455/343
5,703,873 A * 12/1997 Ojanpera et al. ............. 370/332
5,930,366 A * 7/1999 Jamal et al. .................. 370/509
5,940,381 A * 8/1999 Freeburg et al. ............. 370/331
5,956,650 A * 9/1999 Suzuki et al. ................ 455/550
6,014,406 A * 1/2000 Shida et al. .................. 375/202
6,119,015 A * 12/2000 Eun ............................. 455/502

FOREIGN PATENT DOCUMENTS

| JP | 4-334215 | 11/1992 | ............ H04B/7/26 |
| JP | 7-30478 | 1/1995 | ............ H04B/7/26 |
| JP | 8-317464 | 11/1996 | ............ H04B/7/38 |

* cited by examiner

*Primary Examiner*—Douglas Olms
*Assistant Examiner*—Shick Hom
(74) *Attorney, Agent, or Firm*—Finnegan, Henderson, Farabow, Garrett & Dunner, L.L.P.

(57) ABSTRACT

A method for controlling communication of mobile equipment in which the power consumed by the repetition of useless asynchronous reception for establishing synchronization can be reduced. The control unit (5) of a mobile station which is the mobile equipment controls the duration of asynchronous reception suspending time elapsed until asynchronous reception is resumed after the asynchronous reception is suspended for synchronization establishing so the duration can be extended in accordance with the number of continuous synchronization establishment failure or the time continuously elapsed from a failure when the synchronization establishment between the mobile station and a base station has continuously failed.

22 Claims, 12 Drawing Sheets

METHOD FOR CONTROLLING COMMUNICATION OF MOBILE EQUIPMENT AND MOBILE EQUIPMENT

TECHNICAL FIELD

This invention relates to a method for controlling mobile equipment in which communication is performed between a base station and a mobile station, and to a mobile equipment per se, and more particularly to a method for controlling mobile equipment in which in the event that a control signal transmitted from the base station cannot be continuously received during asynchronous reception to establish synchronization with the base station, the duration of reception suspending time elapsed until the mobile station resumes asynchronous reception, thereby reducing power consumption, and to a mobile equipment effecting the method.

BACKGROUND ART

In general, as regards this kind of mobile communication system, the base station sends control signals at fixed intervals. When the power is turned on or when synchronization with the base station has been lost, the mobile station (mobile equipment) performs continuous reception (asynchronous reception) of given duration to establish synchronization with the base station.

When a control signal is received from the base station during this asynchronous reception, the mobile station reproduces the transmission clock of the base station from this control signal, thereby to establish the synchronization.

Thereafter, reception is performed only with timing and slots instructed by the control channel; otherwise, no reception is performed or only transmission is performed.

Figure 9:
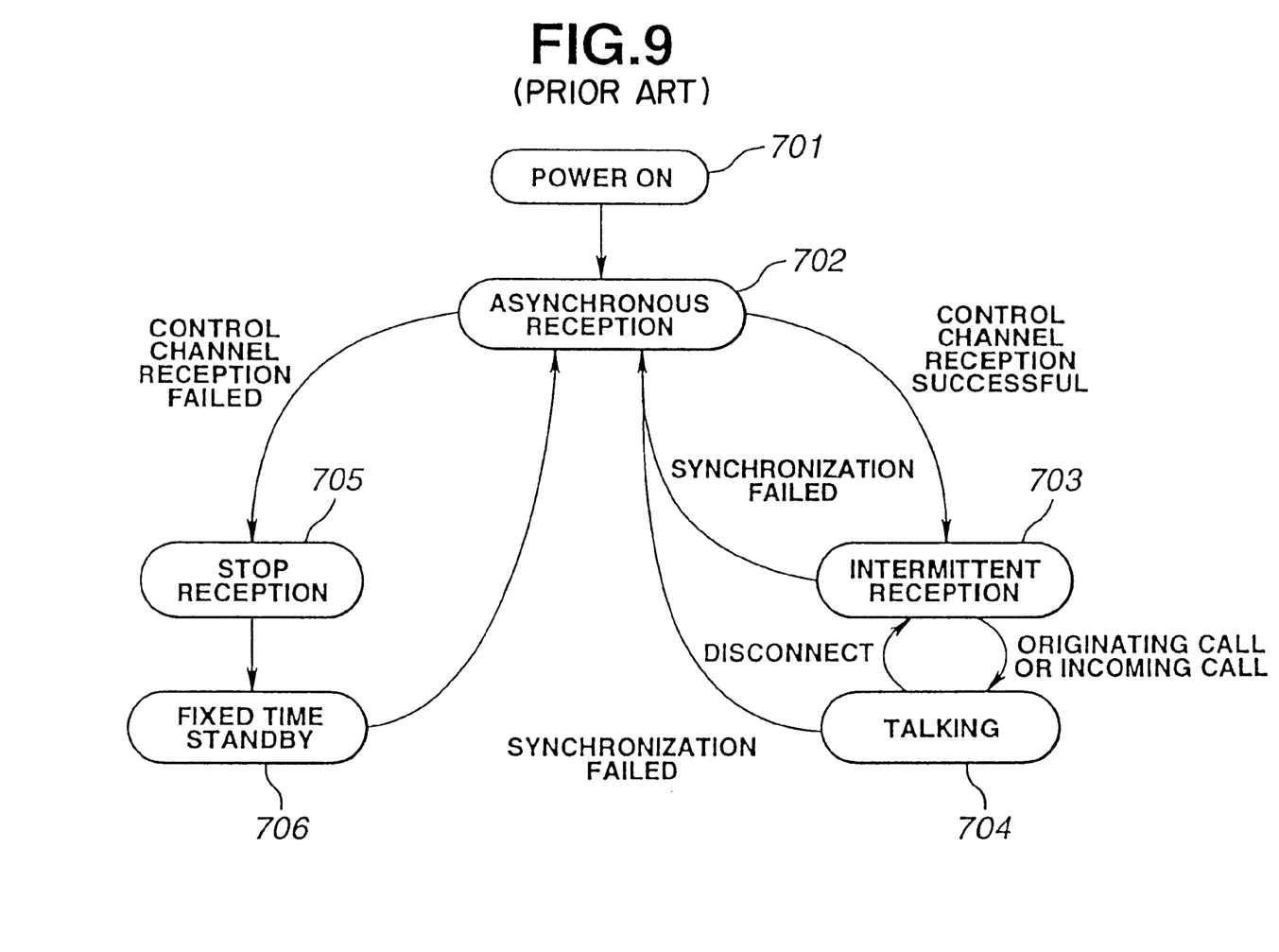
FIG. 9 is a state transition diagram showing an asynchronous receiving operation in accordance with a conventional method.

FIG. 9 is shows operations of a mobile station of the above-described conventional mobile communication system in the form of a state transition diagram.

In FIG. 9, when the power of the mobile station is turned "ON" (state 701), this mobile station is not yet in synchronization with the base station. Therefore, it first performs asynchronous reception (state 702). When reception of a control signal from a base station not depicted in the drawing has been successful, the mobile station reproduces the transmission clock of the base station from the control signal sent over the control channel so as to establish the synchronization. After that, the mobile station performs reception only with a timing and slots instructed by the control signal, and otherwise it becomes in an intermittent reception state for power saving (state 703).

In this state, when there is an originating call from the mobile station or an incoming call from the base station, the mobile station becomes in a communication state (state 704). When this call ends, the mobile station returns to the intermittent reception state of state 703.

Also, in the intermittent reception state of state 703 or the talking state of state 704, if reception of the control signal from the base station becomes impossible and synchronization is lost, the mobile station returns to the asynchronous reception state for establishing synchronization of state 702.

Further, in the asynchronous reception state of state 702, if reception of a control signal from the base station fails, this asynchronous reception is suspended (state 705). Then, after standing by for a given time (state 706) the mobile station again returns to state 702, performs asynchronous reception for establishing synchronization, and repeats this operation until a control signal is successfully received from the base station in state 702 and synchronization is established.

Figure 10:
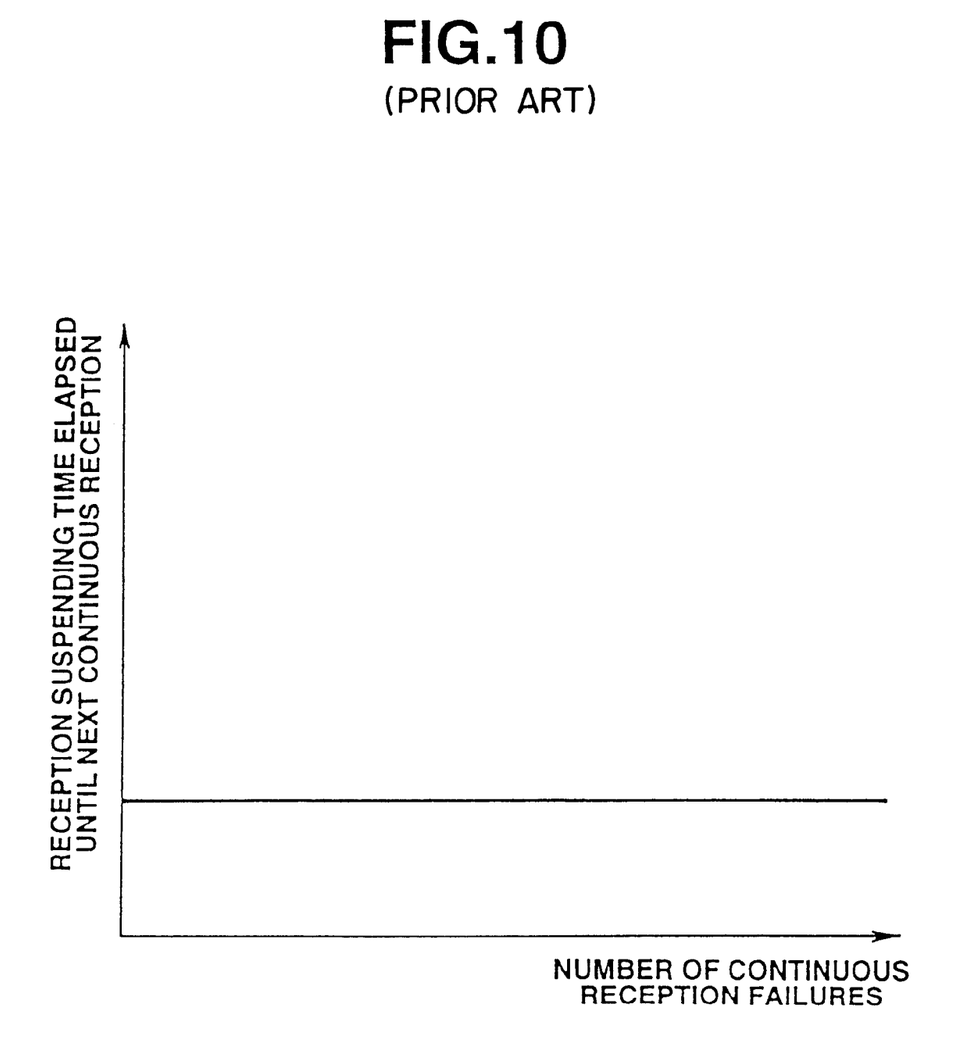
FIG. 10 is a graph showing another example of the relation between reception suspending time and reception failure count in accordance with a conventional method.

FIG. 10 is a graph showing standby time indicated in state 706 in the conventional mobile station shown in FIG. 9, that is to say, the reception suspending time until resuming the asynchronous reception in the event that reception of a control signal sent from the base station has failed by asynchronous reception of the mobile station.

As described above, in the conventional mobile station, as shown in FIG. 10, the reception suspending time is a fixed value that is not dependent on the number of consecutive reception failures of a control signal. For example, in the event that the mobile station is outside the communication range of the base station or in a place where radio wave propagation is poor such as in a place between buildings so that reception from the base station for a long time is not possible, asynchronous reception is repeated according to this fixed number, and this creates the problem of useless power consumption.

Also, conventionally, there is known a mobile communication system in which a mobile station is capable of simultaneously establishing synchronization with two different base stations (double waiting). In this system, the mobile station has two synchronization generating units and has two independent control channel timings. Priority level is set in advance for these base stations, and asynchronous reception is first performed with the base station having high priority, and asynchronous reception is next performed with the base station having lower priority.

Figure 11:
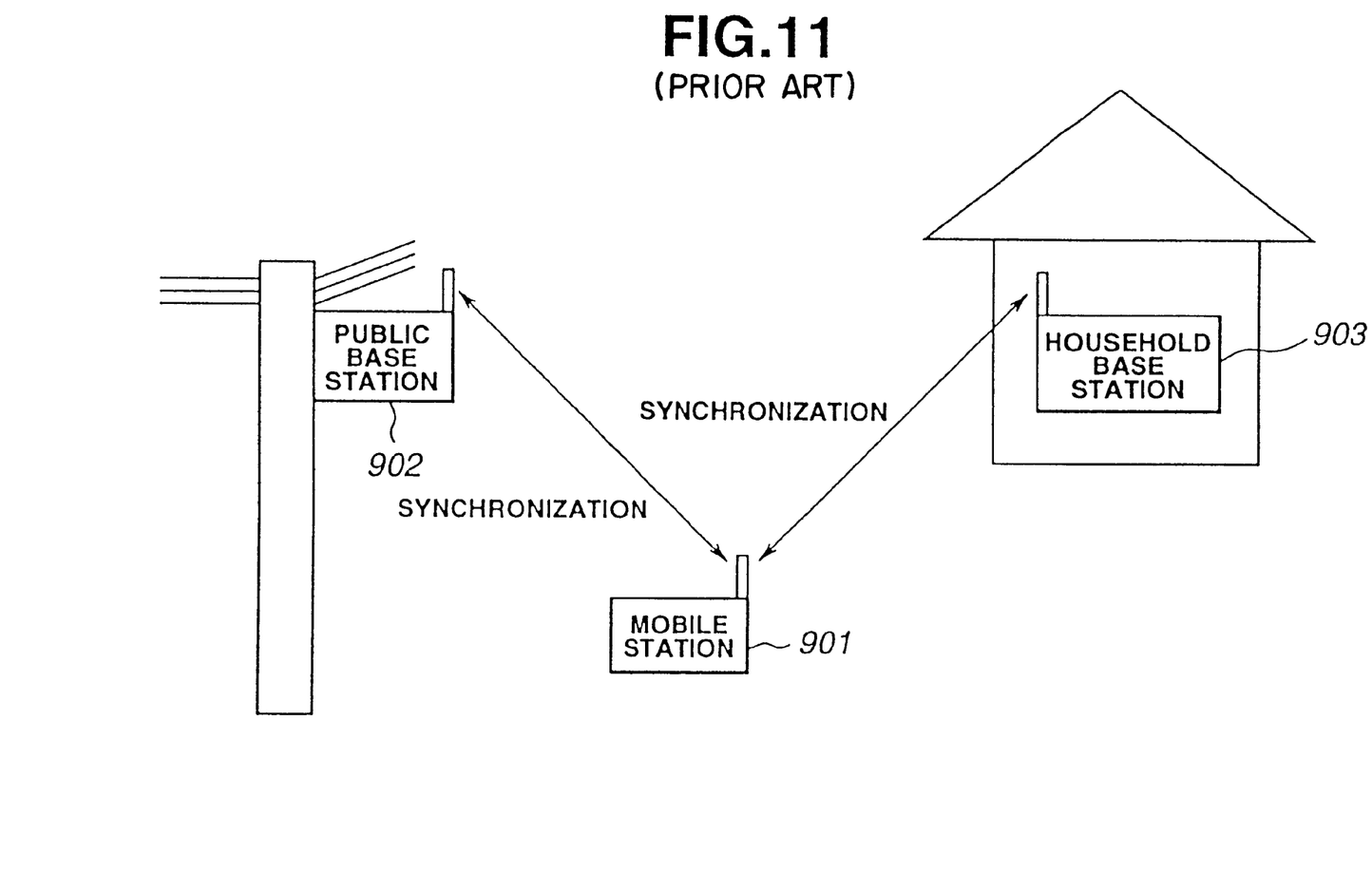
FIG. 11 is a diagram showing a specific example of a mobile communication system capable of double waiting.

FIG. 11 depicts a specific example of a receiving operation of a double waiting mobile station capable of simultaneous establishing of synchronization with two different base stations. In this system, the mobile station 901 is designed, for example, to be able to perform double waiting for establishing synchronization with two different base stations, i.e., a public base station 902 located on a utility pole or the like and a household base station 903 located in a household. It is assumed that the household base station 903 is the high priority base station and the public base station 902 is the lower priority base station.

In this system, it is sometimes the case that these two different base stations are not synchronized with each other so that the transmission timing of control signals of the two bases may overlap. Accordingly, in the case that the transmission timing of control signals overlaps, the mobile station performs a receiving operation for the control signal of the base station of higher priority.

Figure 12:
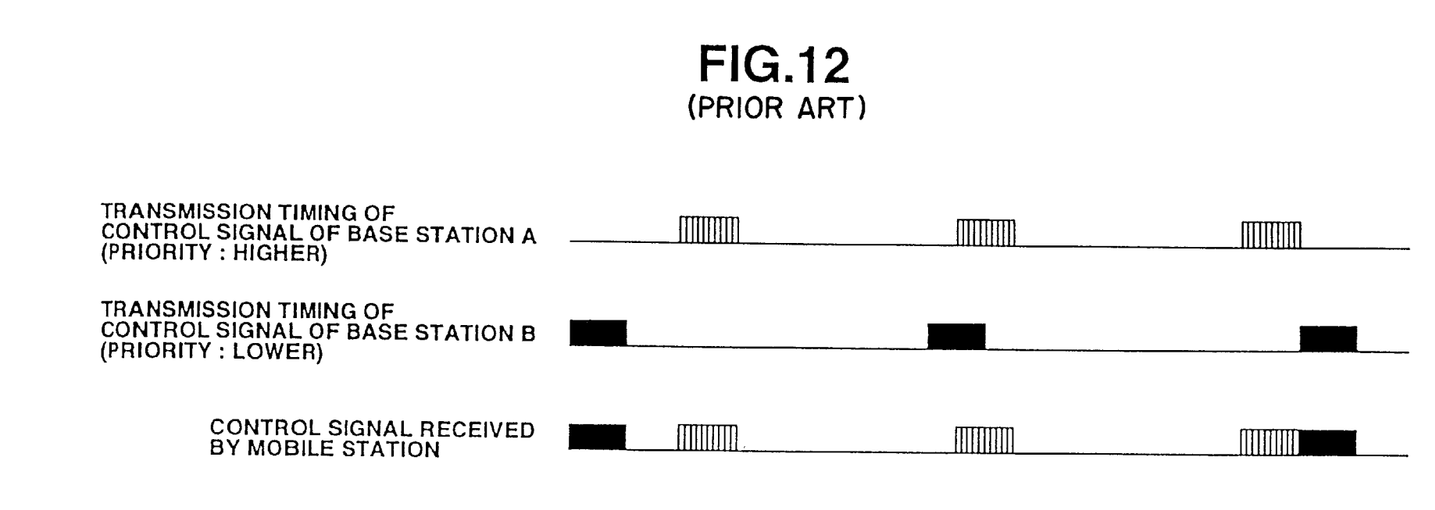
FIG. 12 is a diagram showing a control signal received by a mobile communication system capable of double waiting under transmission timing of control signals transmitted from base stations which have different priorities.

FIG. 12 shows a relationship of respective transmission timing of control signals of a higher priority base station A and a lower priority base station B to a reception control signal at the double waiting mobile station.

In FIG. 12, if the transmission timing of a control signal of the higher priority base station A and the transmission timing of a control signal of the lower priority base station B overlap, the double waiting mobile station receives a control signal of the higher priority base station A and does not receive a control signal from the lower priority base station B, so the number of failures in receiving the control signal from the lower priority base station B is greater than with the higher priority base station A.

Incidentally, with this conventional double waiting mobile station, where there has been a failure to receive a control signal, the reception suspending time elapsed until asynchronous reception resumes is a fixed value for each of the two, so that even if one of the base stations establishes synchronization, reception of a control signal from the other base station fails repeatedly, creating a problem of increased power consumption.

As stated above, in mobile communication equipment, the reception suspending time of asynchronous receiving operations is a fixed value, and therefore asynchronous reception is repeated by the fixed value even when it is outside of the communication range of the base station for a long time, creating the problem of useless power consumption.

In double waiting mobile stations, where synchronization with one of the base stations has been established while reception of a control signal for the other base station fails repeatedly, the problem of increased power consumption is created.

DISCLOSURE OF THE INVENTION

Accordingly, an object of the present invention is to provide a method for controlling communication of mobile equipment and mobile equipment designed to reduce power consumption caused by the repetition of useless asynchronous reception for establishing synchronization.

To achieve the abovementioned object, the invention of claim 1 is a method for controlling communication of a mobile equipment that receives a control signal sent from a base station and performs a synchronization establishing operation with the base station, comprising the steps of suspending reception of the control signal transmitted from the base station for a prescribed time and then resuming the synchronization establishing operation, when the synchronization establishing operation has failed; and extending duration of reception suspending time during which the reception of the control signal transmitted from the base station is suspended in accordance with time elapsed from failure in the synchronization establishing operation, when the synchronization establishing operation has continuously failed.

Further, in the invention of Claim 2 according to Claim 1, the number of continuous failures of the synchronization establishing operation is counted, and the duration of reception suspending time is extended as the count value becomes greater.

Further, in the invention of Claim 3 according to Claim 1 or 2, the reception suspending time is restored to an initial value in response to an operation to the mobile equipment.

Further, in the invention of Claim 4 according to any of Claims 1 to 3, the synchronization establishing operation is performed through asynchronous reception of the control signal sent from the base station for a fixed time.

Further, in the invention of Claim 5 according to Claim 1, the synchronization establishing operation is performed with at least two base stations, and the reception suspending time is set separately for each of the base stations.

Further, in the invention of Claim 6 according to Claim 5, respective priority levels are set in advance for the base stations, and the control signal sent from one of the base stations that has been set to a higher priority level is received earlier.

Further, in the invention of Claim 7 according to Claim 6, the reception suspending time is set shorter for a base station that has been set to a higher priority level than for a base station that has been set to a lower priority level.

Further, the invention of Claim 8 is a method for controlling communication of a mobile equipment that reproduces a transmission clock of a control signal sent from a base station at a fixed interval so as to maintain synchronization of a radio channel with the base station and perform communication with the base station, comprising the steps of performing an asynchronous receiving operation involving asynchronous reception for a fixed time of the control signal sent at the fixed interval from the base station for establishing synchronization with the base station, when synchronization with the base station is lost; suspending the asynchronous receiving operation for a prescribed time and then resuming the asynchronous receiving operation for synchronization establishment, when the synchronization establishment with the base station through the asynchronous receiving operation has failed; and extending duration of asynchronous reception suspending time during which the asynchronous receiving operation is suspended, in accordance with time elapsed from loss of the synchronization with the base station, when the synchronization establishment with the base station through the asynchronous receiving operation has continuously failed.

Further, in the invention of Claim 9 according to Claim 8, the number of the continuous failures of the synchronization establishment with the base station is counted, and duration of the asynchronous reception suspending time is extended as the count value becomes greater.

Further, in the invention of Claim 10 according to Claim 8 or 9, wherein the asynchronous reception suspending time is restored to an initial value in response to an operation to the mobile equipment.

Further, in the invention of Claim 11 according to Claim 8, the synchronization establishing operation is performed with at least two base stations, and the asynchronous reception suspending time is set separately for each of the base stations.

Further, in the invention of Claim 12 according to Claim 11, respective priority levels are set in advance for the base stations, and the control signal sent from one of the base stations that has been set to a higher priority level is received earlier.

Further, in the invention of Claim 13 according to Claim 12, the reception suspending time is set shorter for a base station that has been set to a higher priority level than for a base station that has been set to a lower priority level.

Further, the invention of Claim 14 is a mobile equipment that reproduces a transmission clock of a control signal sent from a base station at a fixed interval so as to maintain synchronization of a radio channel with the base station and performs communication with the base station, comprising asynchronous receiving means for performing an asynchronous receiving operation involving asynchronous reception for a fixed time of the control signal sent from the base station at the fixed interval for establishing synchronization with the base station, when the synchronization with the base station is lost; first control means for suspending the asynchronous receiving operation for a prescribed time and then resuming the asynchronous receiving operation by the asynchronous receiving means, when synchronization establishment with the base station through the asynchronous receiving operation has failed; and second control means for extending duration of asynchronous reception suspending time during which the asynchronous receiving operation is suspended by the first control means, in accordance with time elapsed from loss of the synchronization with the base station, when the synchronization establishment with the base station through the asynchronous receiving operation has continuously failed.

Further, in the invention of Claim 15 according to Claim 14, the second control means comprises counting means for counting the number of the continuous failures of the synchronization establishment with the base station, wherein the duration of the asynchronous reception suspending time is extended as the count value of the counting means becomes greater.

Further, in the invention of Claim 16 according to Claim 14 or 15, further comprising asynchronous reception suspending time restoring means for restoring the asynchronous reception suspending time to an initial value in accordance with a prescribed operation.

Further, in the invention of Claim 17 according to Claim 14, the synchronization establishing operation is performed with at least two base stations, and the asynchronous reception suspending time is set separately for each of the base stations.

Further, in the invention of Claim 18 according to Claim 17, respective priority levels are set in advance for the base stations, and the control signal sent from one of the base stations that has been set to a higher priority level is received earlier.

Further, in the invention of Claim 19 according to Claim 18, wherein the asynchronous reception suspending time is set shorter for a base station that has been set to a higher priority level than for a base station that has been set to a lower priority level.

BEST MODE FOR CARRYING OUT THE INVENTION

Embodiment of the mobile communication method and device according to this invention will be described in detail below referring to the accompanying drawings.

Figure 1:
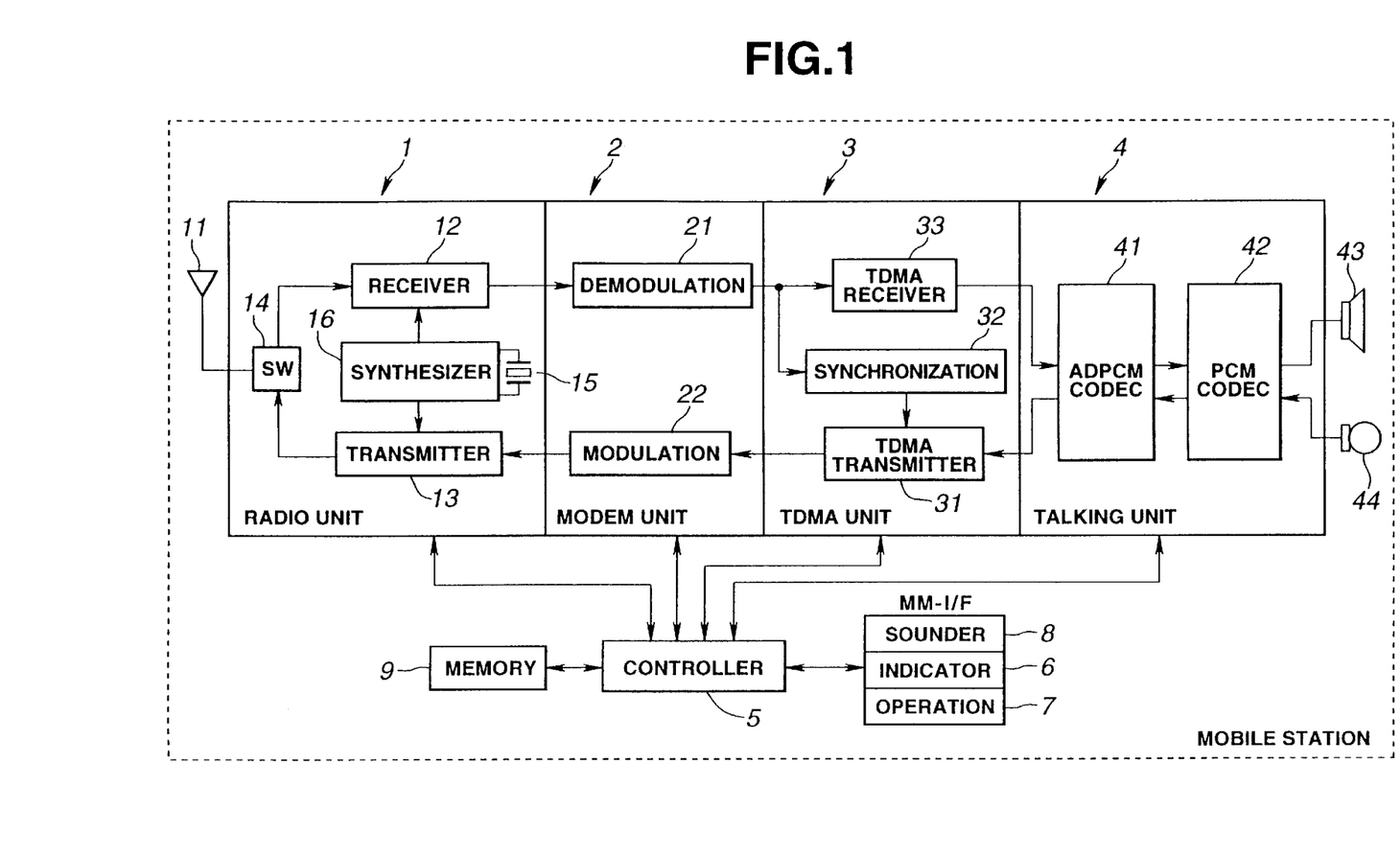
FIG. 1 is a block diagram showing the entire configuration of a mobile station employing the method for controlling communication of mobile equipment and the mobile station according to this invention.

FIG. 1 is a block diagram showing a mobile station (mobile equipment) designed implementing the mobile communication method and device according to this invention. In FIG. 1, this mobile station comprises an antenna 11 for transmitting and receiving radio waves with a base station not shown in the drawing; a radio unit 1 for transmitting and receiving signals through the antenna 11; a modem unit 2 for performing demodulation of reception signals output from the radio unit 1 and modulation of transmission signals output from a channel codec unit 3 described later, a channel codec unit 3 for performing a process of acquiring slot signals received from reception signals demodulated by the modem unit 2 and a process for inserting transmission signals output by a talking unit 4, described later, into prescribed time slots and generating intermittent signals; a talking unit 4 for performing ADPCM (Adaptive Pulse Code Modulation) decoding and PCM (Pulse Code Modulation) decoding on reception signals output from the channel codec unit 3 and PCM encoding and ADPCM encoding on transmission signals output from a microphone 44, described later; a speaker 43 that serves as the receiver; a microphone 44 that serves as the transmitter; a controller unit 5 for executing control of the entire device; an indicator unit 6 for indicating information required for communication, dial numbers and the like; an operation unit 7 for performing various operations including key dialing operations; a sounder 8 for emitting a call tone; and a memory unit 9 for storing information required for control, programs, speed dialing and the like.

The radio unit 1 comprises a transmission/reception switch (SW) 14 for switching the antenna 11 between a receiver unit 12 and a transmitter unit 13; a reference oscillator 15 such as a quartz oscillator or the like; a synthesizer 16 for synthesizing from the reference oscillator 15 the carrier signal required for performing transmission or reception; a receiver unit 12 for frequency conversion of received radio frequency signals using the carrier signal output from the synthesizer 16; and a transmitter unit 13 for performing frequency conversion of modulated transmission signals output from the modem unit 2 by using the carrier signal output from the synthesizer 16, power-amplifying the signals to the level required for transmission, and transmitting the signals.

The modem unit 2 comprises a demodulation unit 21 for demodulating and detecting $\pi/4$ shift QPSK (Quadrature Phase Shift Keying) modulated signals of received baseband signals output from the receiver unit 12 and converting these to serial data, and a modulation unit 22 for modulating serial data signals from a TDMA transmitter unit 31, described later, into $\pi/4$ shift QPSK modulated signals.

The channel codec unit 3 comprises a synchronization circuit 32 for generating synchronization signals from time division multiplexed serial data signals output from the demodulation unit 21; a TDMA receiver unit 33 for acquiring slot signals assigned to the station from reception signals on the basis of these synchronization signals, determining the type of data from data identifying codes (CI codes), and outputting these to the prescribed output port; and a TDMA transmitter unit 31 for transmitting transmission signals from the talking unit 4 with transmission slots.

The talking unit 4 comprises an ADPCM codec 41 for decoding adaptive differential pulse-encoded signals output from the TDMA receiver unit 33 and generating PCM signals, as well as performing voice encoding in accordance with linear prediction of voice signals, performing adaptive differential pulse encoding; and a PCM codec 42, connected to the speaker 43 that serves as the receiver and the microphone 44 that serves as the transmitter, for converting into analog signals that have been digitized into PCM code, as well as digitizing analog voice signals into PCM code.

Next, the operation will be described.

Reception signals received through the antenna 11 from a base station not shown in the drawing are frequency converted by the receiver unit 12, and then demodulated by the demodulation unit 21. Then, the slot allotted to this station is acquired from the time division multiplexed reception signals by the TDMA receiver unit 33. Then, the signals are decoded by the ADPCM codec 41 and PCM codec 42 and output from the speaker 43.

Further, as regards transmission signals, in a route that is the reverse of that for the reception signals, first, voice signals input from the microphone 44 are encoded by the PCM codec 42 and ADPCM codec 41. Then, the TDMA transmitter unit 31 sends the input voice signals using the prescribed transmission slot determined together with the base station. Then, the signals are modulated by the modulation unit 22, frequency modulated by the transmitter unit 13, and transmitted through the antenna 11.

Figure 2:
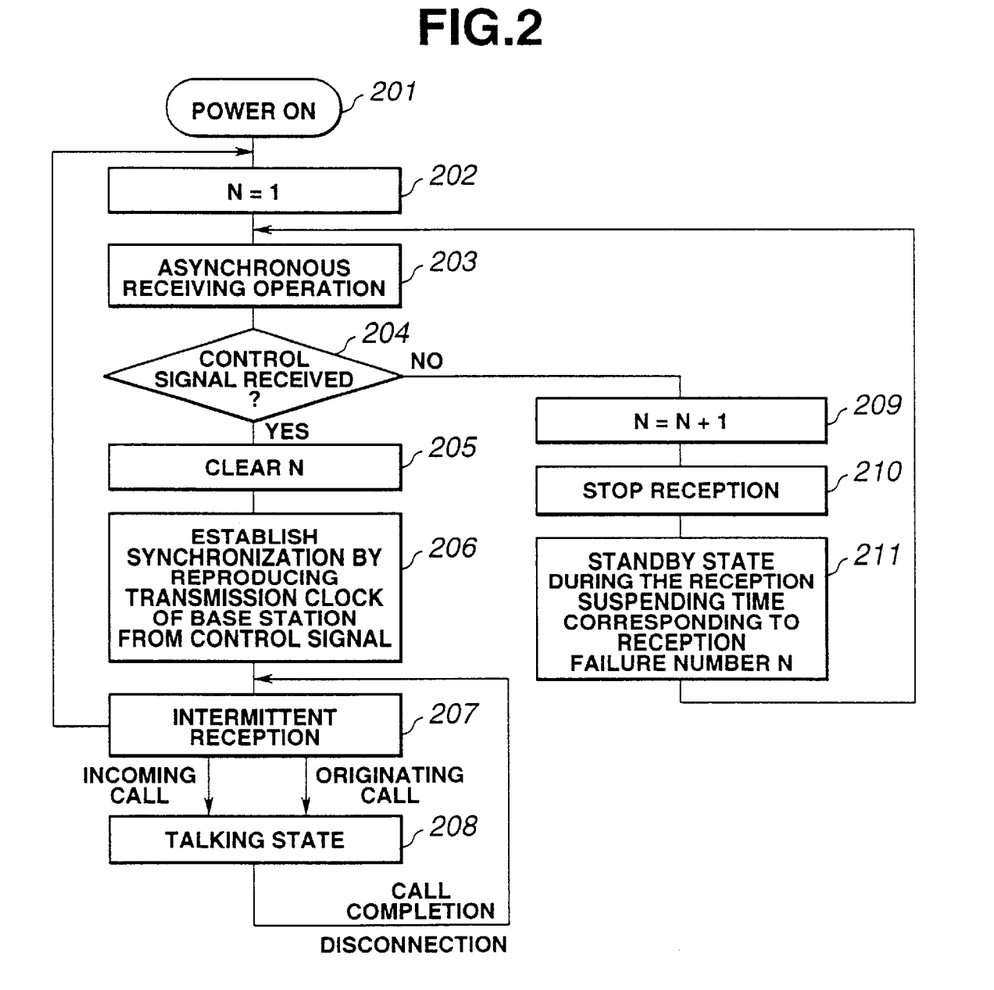
FIG. 2 is a flow chart showing the synchronization establishing operation of the mobile station shown in FIG. 1.

FIG. 2 shows the synchronization establishing operation in the mobile station shown in FIG. 1 in the form of a flow chart.

In FIG. 2, control signals are transmitted at fixed intervals by a base station not shown in the drawing. In the mobile station, when the power is turned "ON" or synchronization with the base station has been lost, a fixed continuous receiving operation (asynchronous receiving operation) is performed to receive these control signals.

Now then, when the power has been turned on in the mobile station (step 201), since the base station is not synchronized with the base station at that time, the number of reception failures N of control signals from the base station for synchronization establishment is set to "1" (step 202) and an asynchronous receiving operation is performed (step 203). When the mobile station has received the target control signal (step 204, YES), the number of reception failures N is cleared (step 205), and the transmission clock from the received control signal is reproduced to establish synchronization (step 206). After this, intermittent reception involving performing the reception operation only with the timing and slot designated by the control signal is performed (step 207). At this time, if synchronization with the base station is lost, the mobile station returns to step 202 and again performs asynchronous reception (step 203).

If an originating call or incoming call should occur during the intermittent receiving operation of step 207, the talking state is entered once call control is completed (step 208). Then, when talking is completed, completion of call and circuit disconnect call control is performed, after which the mobile station returns to intermittent reception (step 207).

In the event that the target control signal was not received in step 204, the number of reception failures N is incremented by 1 (step 209) and reception is suspended (step 210). Then, the mobile station enters a standby state for a reception suspending time in accordance with the number of reception failures N (step 211). After the aforementioned time has elapsed, the mobile station again returns to step 203 and performs asynchronous reception.

Figure 3:
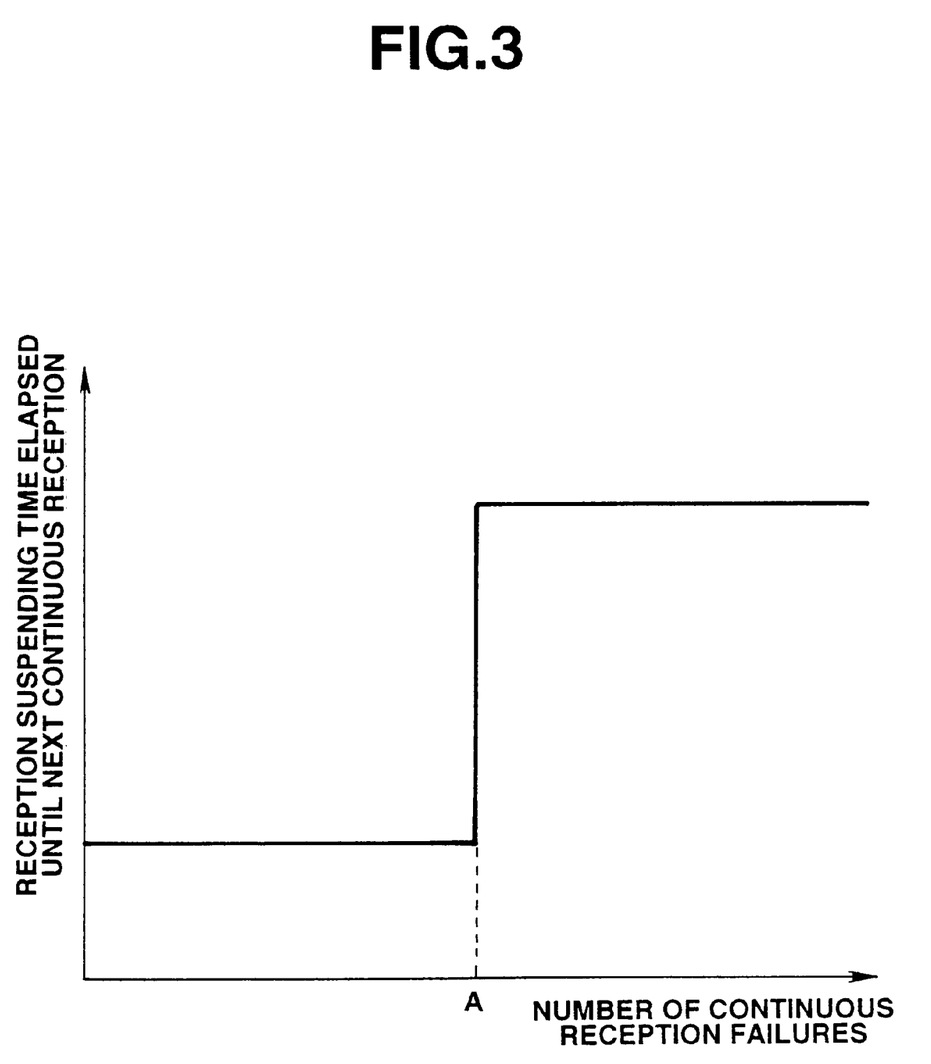
FIG. 3 is a graph showing an example of the relation between reception suspending time and reception failure count in the mobile station shown in FIG. 1.

FIG. 3 depicts how the reception suspending time elapsed until asynchronous reception is resumed varies in accordance with the number of reception failures of the control signal in the synchronization establishing operation shown in FIG. 2, when a mobile station has failed to receive a control signal.

Specifically, in FIG. 3, control is performed in two ways by using a threshold value being A times of reception failures. Namely, the reception suspending time is shortened when the number of reception failures is less than A, while the reception suspending time is extended when the number of reception failures is greater than A.

By adopting this configuration, in such an event that the mobile station is not too distant from the base station, the reception suspending time is shortened so that subsequent asynchronous reception can be performed without delay, while in the event that the mobile station is too far distant from the base station, the reception suspending time is extended in accordance with the increase in the number of reception failures, thereby allowing power consumption to be reduced.

Figure 4:
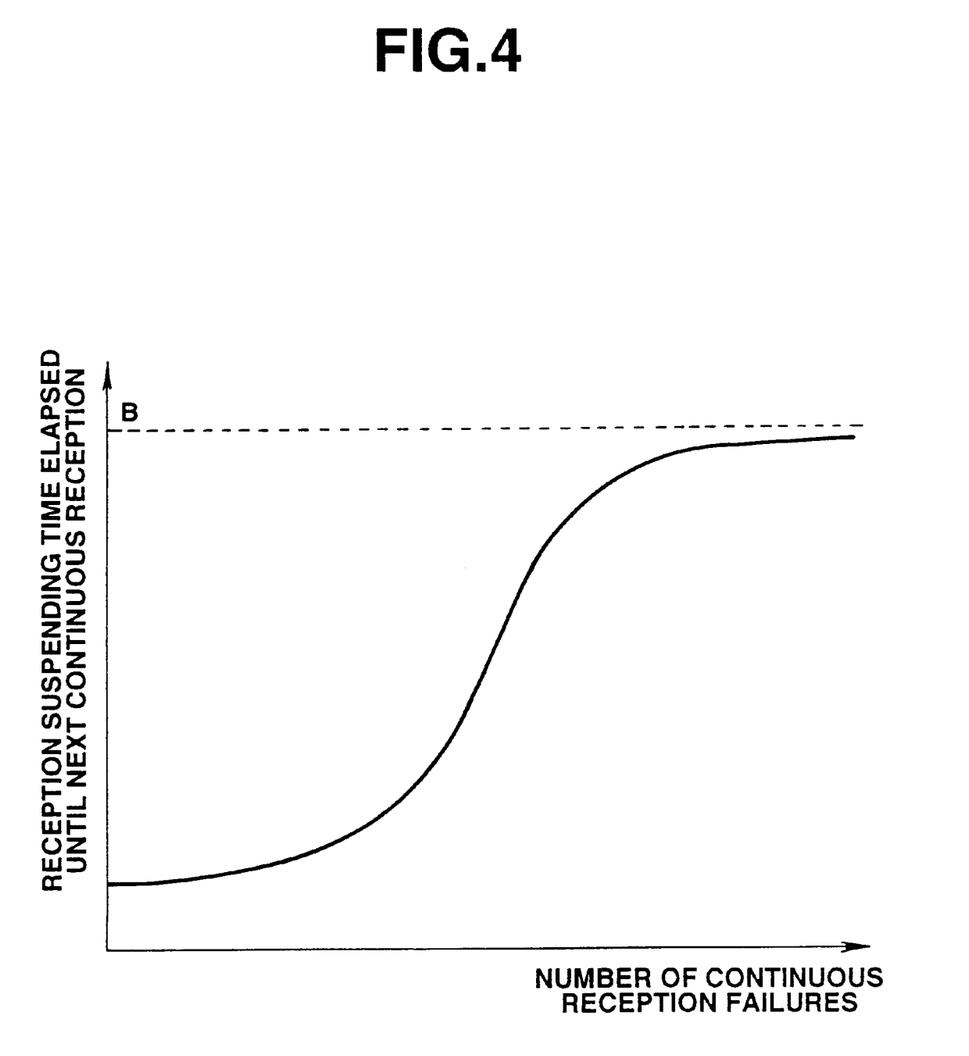
FIG. 4 is a graph showing another example of the relation between reception suspending time and reception failure count in the mobile station shown in FIG. 1.

FIG. 4 depicts another example of how the reception suspending time elapsed until asynchronous reception is resumed varies in accordance with the number of reception failures of the control signal in the synchronization establishing operation shown in FIG. 2, when a mobile station has failed to receive a control signal.

This example is suitable for use in a small cell format system such as PHS, for example. When the number of reception failures is small, the reception suspending time is shortened, and as the number of reception failures becomes larger, stageless or multistaged control is performed so as to converge the reception suspending time at the value B.

Reduced power consumption may be achieved with this configuration as well. Particularly in small cell format systems such as PHS, it sometimes happens that a mobile station goes outside of the communication range of one base station and soon thereafter enters the communication range of another base station. Thus, by shortening the reception suspending time when the number of reception failures is small, it is possible to change to asynchronous reception soon after entering the communication range of this another base station. By converging the reception suspending time onto a certain value B as the number of reception failures increases, it is possible to reduce the time elapsed until changing to asynchronous reception when the mobile station enters the communication range of a base station.

Figure 5:
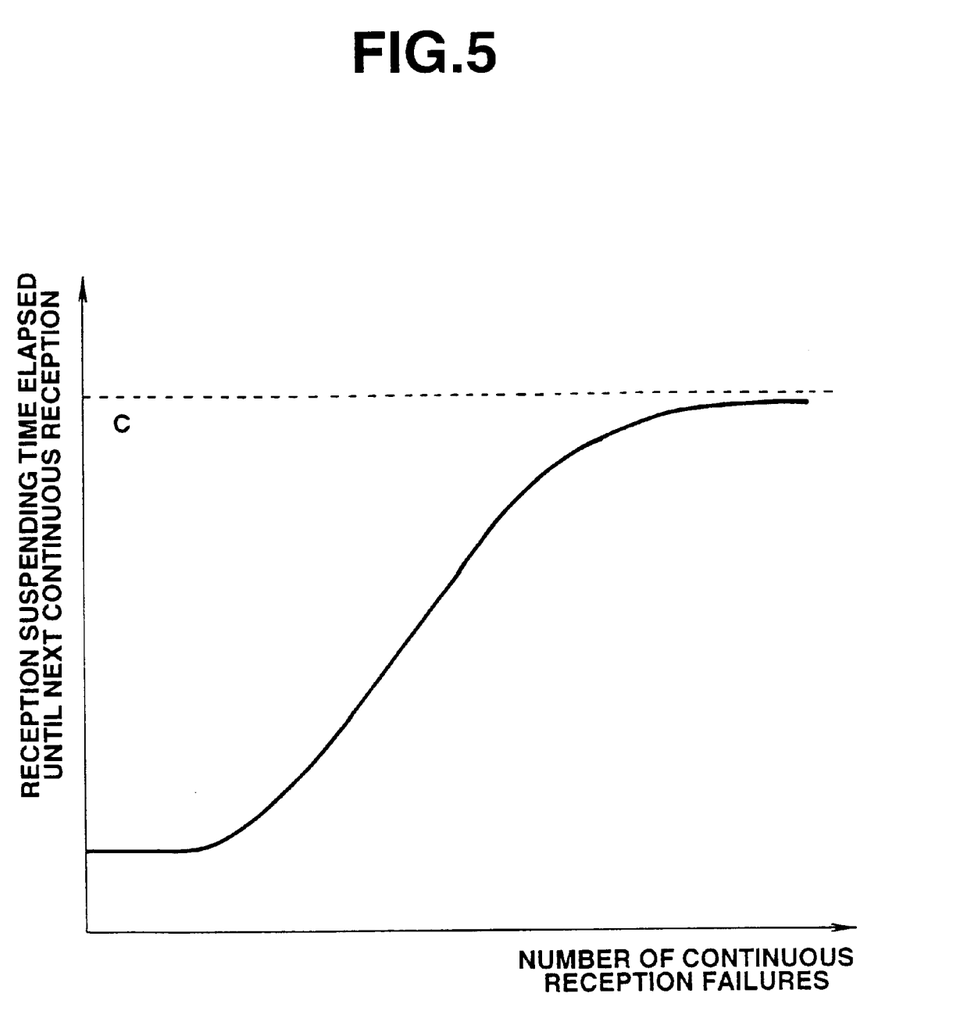
FIG. 5 is a graph showing an example of the relation between reception suspending time and reception failure count in a mobile station capable of double waiting according to this invention.

FIG. 5 depicts how the reception suspending time elapsed until a mobile station capable of double waiting resumes asynchronous reception varies in accordance with the number of reception failures of the control signal in the synchronization establishing operation shown in FIG. 2, when the mobile station capable of double waiting has failed to receive a control signal.

In the configuration of FIG. 5, as regards this double waiting, the reception suspending time is shortened when the number of reception failures is small and the reception suspending time is converged onto a certain value C as the number of reception failures increases, respectively. Here, the solid line graph and the broken line graph respectively show how the reception suspending time elapsed until this mobile station resumes asynchronous reception varies in accordance with the number of reception failures for two double waiting base stations.

Reduced power consumption may be achieved with this configuration as well. Particularly as regards mobile stations capable of double waiting, in the event that synchronization has been achieved with one of the base stations but synchronization with the other base station cannot be achieved due to being outside of the area of the base station, extending the reception suspending time in accordance with an increase the number of reception failures can reduce power consumption relative to power consumption in conventional double waiting mobile stations.

Figure 6:
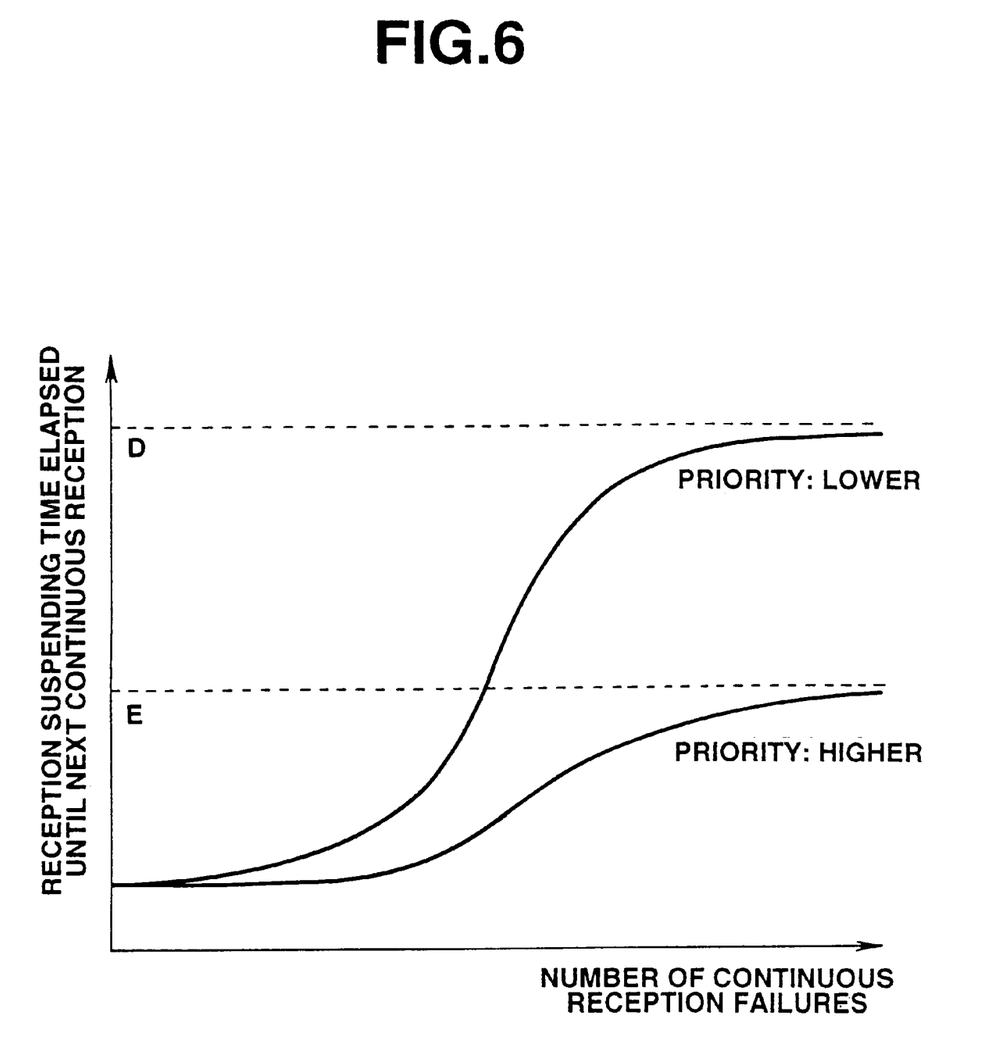
FIG. 6 is a graph showing another example of the relation between reception suspending time and reception failure count in a mobile station capable of double waiting according to this invention.

FIG. 6 depicts how the reception suspending times elapsed with respect to each base station until a mobile station capable of double waiting resumes asynchronous reception respectively vary in accordance with the number of reception failures of control signals transmitted by a higher priority base station and a lower priority base station in the synchronization establishing operation shown in FIG. 2, when a mobile station capable of double waiting has failed to receive a control signal.

Specifically, in FIG. 6, when the number of reception failures is small, the reception suspending time with respect to each base station is short for both the higher priority base station and the lower priority base station. As the number of reception failures increases, the reception suspending time with respect to the lower priority base station is converged towards a value D, while the reception suspending time with respect to the higher priority base station is converged towards a value E which is smaller than the reception suspending time D for the lower priority base station.

In this configuration as well, the reception suspending time elapsed when a mobile station is not too far distant from a base station is reduced, allowing the next asynchronous reception to be performed without delay. In the event that the mobile station is far distant from the base station, the reception suspending time is extended in accordance with an increase the number of reception failures, allowing power consumption to be reduced. In particular, by setting the value for reception suspending time of the higher priority base station lower than the value for reception suspending time of the lower priority base station, the time elapsed until synchronization establishment when a mobile station reenters the communication range of the higher priority base station can be shortened.

Incidentally, in the foregoing configuration, an increase in the number of reception failures N of control signals in the asynchronous receiving operation causes the reception suspending time to be extended, and this results in a longer time being required for synchronization establishment.

Accordingly, the mobile station may be constituted so that an extended reception suspending time can be restored to the initial value through operation of a specific key or through some sort of key operation.

Figure 7:
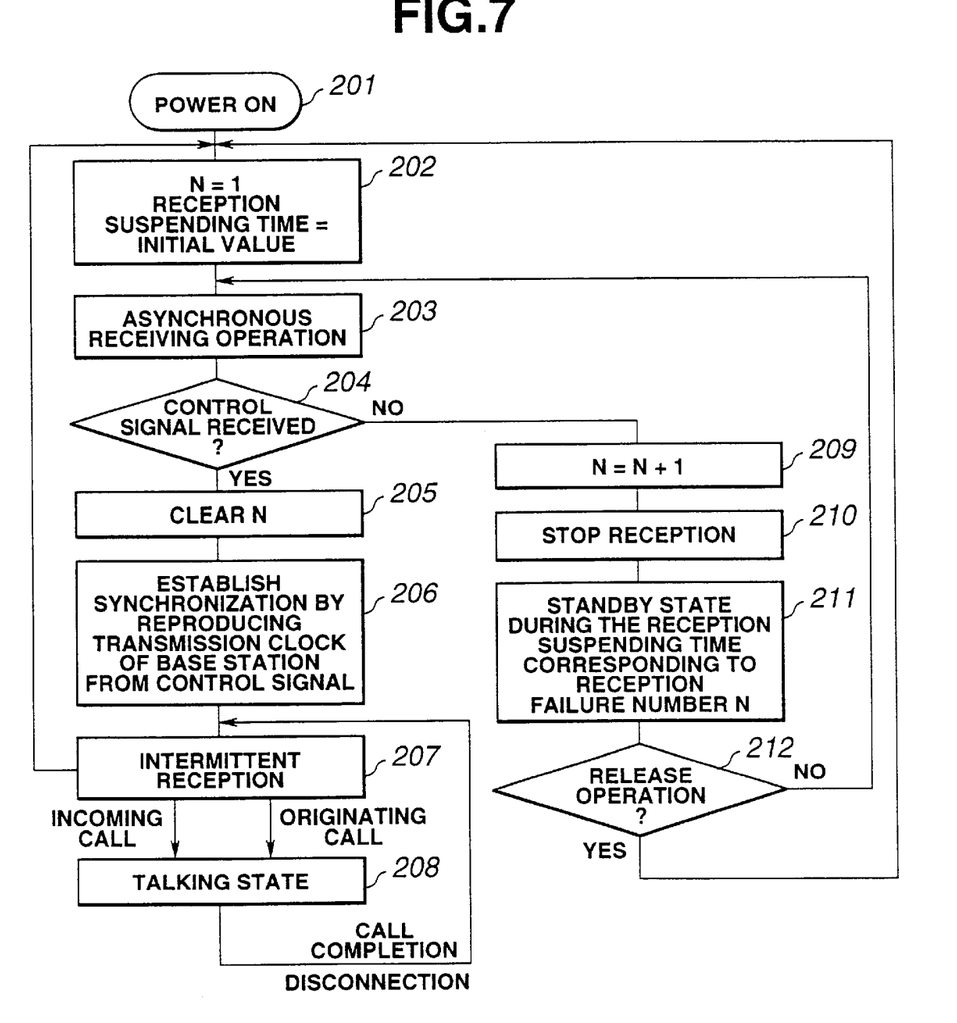
FIG. 7 is a flow chart showing another example of the synchronization establishing operation of the mobile station shown in FIG. 1.

FIG. 7 shows a flow chart of another example of synchronization establishment operation in the mobile station shown in FIG. 1, where such the abovementioned configuration is adopted.

In FIG. 7, the configuration is such that where the mobile station is in standby state during reception suspending time in accordance with the number of reception failures N of step 211 shown in FIG. 2, a release operation through operation of a specific key or through some sort of key operation restores the reception suspending time to the initial value.

Specifically, in the flow chart of FIG. 7, step 211 is followed by checking as to whether or not a release operation has occurred at the mobile station (step 212). In the event that there has been no release operation (step 212, NO), the mobile station returns to step 203 analogous to the flow chart shown in FIG. 2, whereas in the event that it is ascertained in step 212 that a release operation has occurred (step 212, YES), it returns to step 202 and the reception suspending time is restored to the initial value.

Thus, in the flow chart shown in FIG. 7, it is so configured that N is set to equal 1 in step 202, and the reception suspending time is set to the initial value. Other steps are analogous to those in the flow chart of FIG. 2.

This configuration allows reception suspending time to be restored to the initial value by means of a user operation in the event that the reception suspending time has become extended due to a high number of reception failures N of control signals during the asynchronous receiving operation.

In the embodiment described above, the reception suspending time is extended in accordance with the number of failures to establish synchronization based on the asynchronous receiving operation, that is, in accordance with the number of failures to receive a control signal during asynchronous receiving operations. Alternatively, it would be possible to effect control such that the reception suspending time is extended in accordance with the time elapsed from the start of the first asynchronous receiving operation for synchronization establishment.

Figure 8:
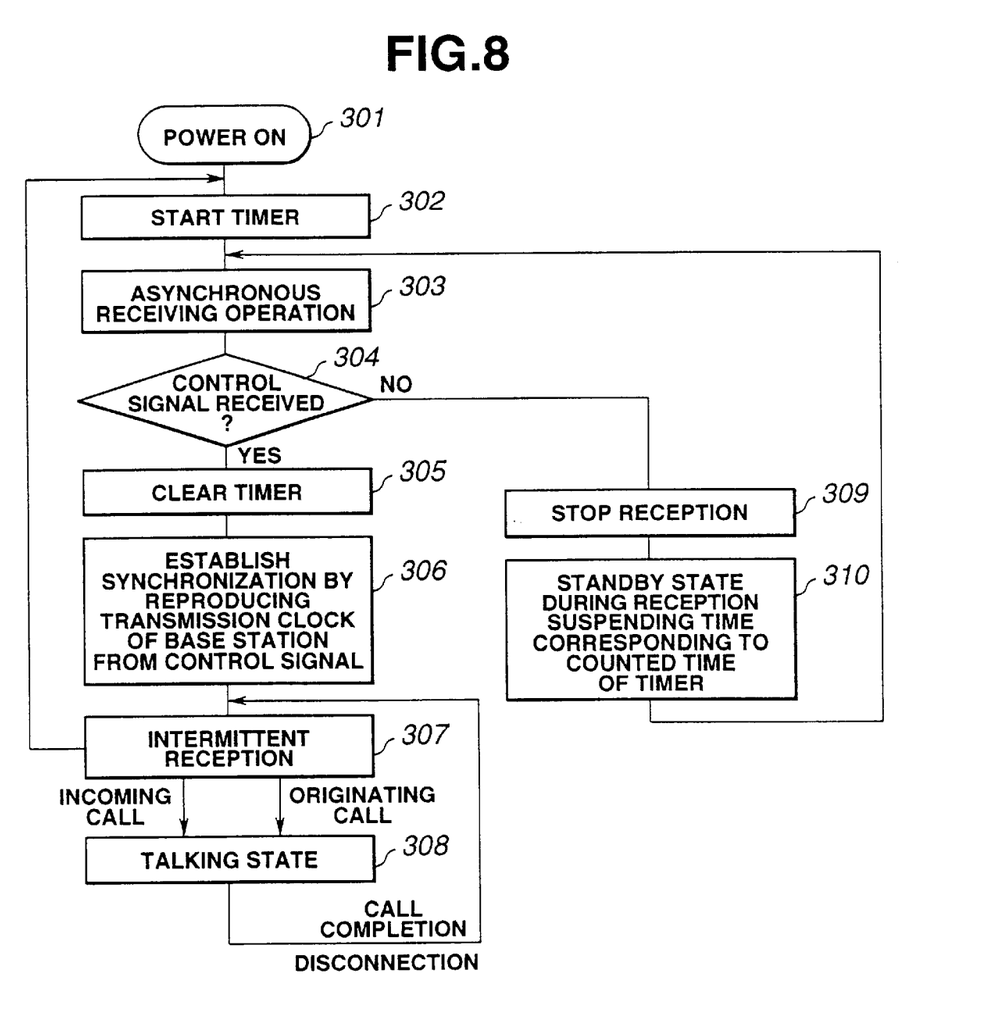
FIG. 8 is a flow chart showing still another example of the synchronization establishing operation of the mobile station shown in FIG. 1.

FIG. 8 is a flow chart showing still another example of the synchronization establishing operation in the mobile station depicted in FIG. 1 in such a configuration.

In FIG. 8, when the power is turned "ON" or synchronization with the base station has been lost, a timer is started and a fixed continuous receiving operation (asynchronous receiving operation) for receiving a control signal from the base station is performed. In the event that synchronization continuously cannot be established through this asynchronous receiving operation, control is effected so as to extend the reception suspending time in accordance with the time counted by a timer.

Specifically, when the mobile station power is turned "ON" (step 301), the timer is started (step 302) and the asynchronous receiving operation is performed (step 303). Here, if the target control has been received (step 304, YES), the timer is cleared (step 305), a transmission clock is reproduced from the received control signal, and synchronization establishment is performed (step 306). After this, intermittent reception involving performing the reception operation only with the timing and slot designated by the control signal is performed (step 307). At this time, if synchronization with the base station is lost, the mobile station returns to step 302 and again performs asynchronous reception (step 303).

If an originating call or incoming call should occur during the intermittent receiving operation of step 307, once call control is completed, talking state is entered (step 308). Then, when talking is completed, completion of call and circuit disconnect call control is performed, after which the mobile station returns to intermittent reception (step 307).

If the target control has not been received in step 304, reception is suspended (step 210) and the mobile station enters standby mode for a reception suspending time in accordance with the time counted by the timer (step 310). When the abovementioned time has elapsed, the mobile station again returns to step 303 and performs asynchronous reception.

The relationship between the time counted by the timer and the reception suspending time in this case is controlled in the same manner as described in FIGS. 3 through 6.

Further, in this case as well, the configuration may be such that the reception suspending time can be restored to the initial value by means of a user operation in the event that the reception suspending time has become extended due to a high number of reception failures N of control signals during the asynchronous receiving operation.

Industrial Applicability

This invention relates to a method for controlling a mobile equipment that performs communication with a base station, and to a mobile equipment. According to this invention, during performance of asynchronous reception for synchronization establishment with the base station, the duration of reception suspending time until the mobile station again enters asynchronous reception can be extended in the event that it is been continuously not possible to receive the control signal transmitted from the base station, and to thereby reduce power consumption.

What is claimed is:

1. A method for controlling communication of a mobile equipment that asynchronously receives a control signal sent from a base station to perform a synchronization establishing operation with the base station, comprising the steps of:

recognizing that the synchronization establishing operation has failed;

disabling the reception of the control signal transmitted from the base station for a period from the recognition;

resuming the reception of the control signal after the period from the recognition;

recognizing that the synchronization establishing operation has continuously failed; and extending the period in accordance with time elapsed from the resumption of the synchronization establishing operation.

2. The method for controlling communication of mobile equipment according to claim 1, further comprising counting how many times the synchronization establishing operation continuously fails, and extending the period as the counted times becomes greater.

3. The method for controlling communication of mobile equipment according to claim 1, wherein a reception suspending time is restored to an initial value in response to an actuation to the mobile equipment.

4. The method for controlling communication of mobile equipment according to claim 1, wherein the synchronization establishing operation is performed with at least two base stations, and an asynchronous reception suspending time is set separately for each of the base stations.

5. The method for controlling communication of mobile equipment according to claim 4, wherein respective priority is set in advance for the base stations, and if control signals are sent at the same time from a first base station and a second base station, the control signal sent by the first base station having a higher priority is received in preference to the control signal sent by the second base station having a lower priority.

6. The method for controlling communication of mobile equipment according to claim 4, wherein the reception suspending time is set shorter for a first base station having a higher priority than for a second base station having a lower priority.

7. A method for controlling communication of a mobile equipment that reproduces a transmission clock of a control signal sent from a base station at a fixed interval so as to maintain synchronization of a radio channel with the base station and perform communication with the base station, comprising the steps of:

performing an asynchronous receiving operation involving asynchronous reception for a predetermined period of the control signal sent at the fixed interval from the base station for establishing synchronization with the base station if the synchronization with the base station is lost;

recognizing that the synchronization establishing operation has failed;

disabling the asynchronous receiving operation for a period from the recognition;

resuming the asynchronous receiving operation for synchronization establishment after the period from the recognition;

recognizing that the synchronization establishing operation has continuously failed; and extending the period in accordance with time elapsed from loss of the synchronization with the base station.

8. The method for controlling communication of the mobile equipment according to claim 7, further comprising counting how many times the synchronization establishing operation has continuously failed, and extending the duration of asynchronous reception suspending time as the counted times becomes greater.

9. The method for controlling communication of the mobile equipment according to claim 7, wherein the asynchronous reception suspending time is restored to an initial value in response to an actuation to the mobile equipment.

10. The method for controlling communication of the mobile equipment according to claim 7, wherein the synchronization establishing operation is performed with at least two base stations, and the asynchronous reception suspending time is set separately for each of the base stations.

11. The method for controlling communication of the mobile equipment according to claim 10, wherein respective priority is set in advance for the base stations, and if control signals are sent at the same time from a first base station and a second base station, the control signal sent by the first base station having a higher priority is received in preference to the control signal sent by the second base station having a lower priority.

12. The method for controlling communication of a mobile equipment according to claim 10, wherein a reception suspending time is set shorter for a first base station having a higher priority than for a second base station having a lower priority.

13. A mobile equipment that reproduces a transmission clock of a control signal sent from a base station at a fixed interval so as to maintain synchronization of a radio channel with the base station and performs communication with the base station, comprising:

a first recognizing means for recognizing that the synchronization with the base station is lost;

asynchronous receiving means for performing an asynchronous receiving operation involving asynchronous reception for a fixed time of the control signal sent from the base station at the fixed interval for establishing synchronization with the base station for a period from the recognition if the first recognizing means recognized that the synchronization with the base station is lost;

a second recognizing means for recognizing that the synchronization establishment with the base station through the asynchronous receiving operation has failed;

first control means for disabling the reception of the control signal transmitted from the base station for the period for the recognition and then resuming the reception of the control signal after the period from the recognition if the second recognizing means recognized that the synchronization establishment with the base station through the asynchronous receiving operation has failed;

third recognizing means for recognizing that the synchronization establishment with the base station through the asynchronous receiving operation has continuously failed; and second control means for extending the period in accordance with time elapsed from the resumption of the synchronization with the base station if the third recognizing means recognized that the synchronization establishment with the base station through the asynchronous receiving operation has continuously failed.

14. The mobile equipment according to claim 13, wherein the second control means further comprises counting means for counting how many times the synchronization establishment with the base station has continuously failed, wherein the period is extended as the times counted by the counting means becomes greater.

15. The mobile equipment according to claim 13, further comprising asynchronous reception suspending time restoring means for restoring the continuous reception suspending time to an initial value in response to an actuation to the mobile equipment.

16. The mobile equipment according to claim 14, wherein the synchronization establishing operation is performed with at least two base stations, and an asynchronous reception suspending time is set separately for each of the base stations.

17. The mobile equipment according to claim 16, wherein respective priority levels are set in advance for the base stations, and if control signals are sent at the same time from a first base station and a second base station, the control signal sent by the first base station having a higher priority is received in preference to the control signal sent by the second base station having a lower priority.

18. The mobile equipment according to claim 16, wherein the asynchronous reception suspending time is set shorter for the first base station having a higher priority than for the second base station having a lower priority.

19. A method for controlling communication of a mobile equipment that receives a control signal sent from a base station to perform a synchronization establishing operation with the base station, comprising the steps of:
 recognizing that the reception of the control signal failed;
 disabling the reception of the control signal transmitted from the base station for a period from the recognition;
 resuming the reception of the control signal after the period from the recognition;
 recognizing that the reception of the control signal continuously failed; and
 extending the period in accordance with time elapsed from the resumption of the reception of the control signal.

20. A method for controlling communication of a mobile equipment that receives a control signal sent from a base station to perform a synchronization establishing operation with the base station, comprising the steps of:
 recognizing that the reception of the control signal failed;
 disabling the reception of the control signal transmitted from the base station for a period from the recognition;
 resuming the reception of the control signal after the period from the recognition;
 recognizing that the reception of the control signal continuously failed;
 recognizing a number for the failure of the reception of the control signal; and
 extending the period in accordance with the recognized number.

21. A mobile equipment receiving a control signal sent from a base station to perform a synchronization establishing operation with the base station, the equipment comprising:
 recognizing means for recognizing that the reception of the control signal failed;
 disabling means for disabling the reception of the control signal transmitted from the base station for a period from the recognition;
 resuming means for resuming the reception of the control signal after the period from the recognition;
 recognizing means for recognizing that the reception of the control signal continuously failed; and
 extending means for extending the period in accordance with time delayed from the resumption of the reception of the control signal.

22. A mobile equipment that receives a control signal sent form a base station to perform a synchronization establishing operation with the base station, the equipment comprising:
 recognizing means for recognizing that the reception of the control signal failed;
 disabling means for disabling the reception of the control signal transmitted from the base station for a period from the recognition;
 resuming means for resuming the reception of the control signal after the period from the recognition;
 recognizing means for recognizing that the reception of the control signal continuously failed;
 recognizing means for recognizing a number for the failure of the reception of the control signal; and
 extending means for extending the period in accordance with the recognized number.

\* \* \* \* \*